Feb. 4, 1930. T. E. DIMELOW 1,745,570
METHOD AND MEANS FOR MOLDING ARTIFICIAL TEETH
Filed Dec. 8, 1927
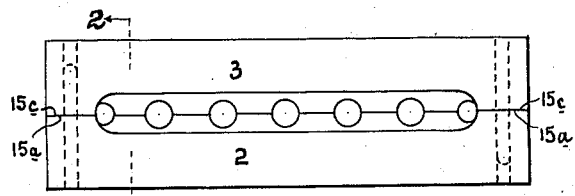
FIG.1
FIG.5
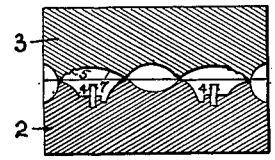
FIG.2
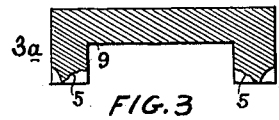
FIG.3
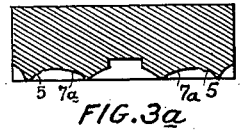
FIG.3a
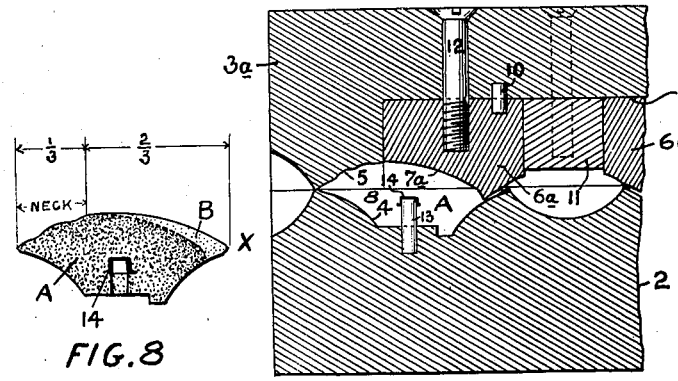
FIG.4
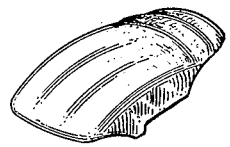
FIG.7
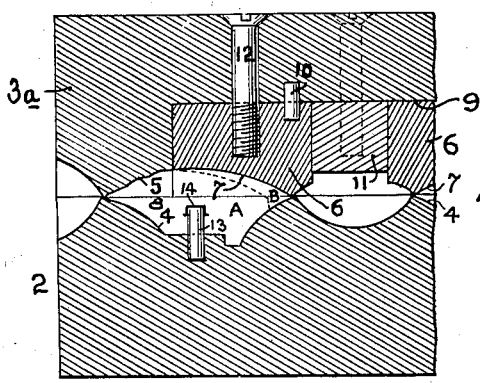
FIG.8
FIG.6
Inventor
Thomas E. Dimelow.
By *(signature)*
Attorney.

Patented Feb. 4, 1930

1,745,570

UNITED STATES PATENT OFFICE

THOMAS E. DIMELOW, OF YORK, PENNSYLVANIA, ASSIGNOR, BY MESNE ASSIGNMENTS, TO THE DENTISTS' SUPPLY COMPANY OF NEW YORK, A CORPORATION OF NEW YORK

METHOD AND MEANS FOR MOLDING ARTIFICIAL TEETH

Application filed December 8, 1927. Serial No. 238,500.

This invention is an improvement upon the general method and means for manufacturing artificial teeth disclosed in Letters Patent No. 1,547,643 dated July 28, 1925, wherein is set out the use of three mold parts cooperating in pairs in such manner that the backing mold part is successively employed in connection with two face mold parts, one of which is adapted to mold the body material in a form less than the normal size of the finished tooth and the other of which completes the molding of the tooth to its full size and, at the same time, applying to the previously molded body part of relatively dark porcelain material a thin facing and an incisal end of relatively light colored porcelain material, said tooth structure being subsequently vitrified. By the process above recited, it was possible to manufacture the teeth in quantity and, at the same time, insure the teeth to be substantially uniform as to form and shade.

Experience has shown that while the general process and mold parts above referred to were adapted to produce exact duplicates of the teeth as to shade and form, certain strains were impressed upon the biscuited body portion of the porcelain material during the final or second stage of the molding operation (preliminary to the vitrifying operation) which caused cracks or weaknesses therein, resulting in the production of "seconds" or defective molding in such quantities as to warrant further improvement in the general process and means employed.

The invention forming the subject matter of this application is intended to overcome the manufacturing difficulties thus experienced in connection with the molding of the teeth under the process set out in the aforesaid Letters Patent No. 1,547,643, and resides more particularly in the method of forming and employing the two face mold parts adapted for successive use with the single back mold part, wherein the cooperation of both of the face molding parts with the single back mold part is such that no undue strains are put upon the body portion of the biscuited tooth structure during the act of adding thereto the lighter shade face enamel in completing the full size of the tooth preliminary to the vitrifying of the same.

The distinguishing feature of my improvements resides in the fact that the neck portions of the two alternately employed face molding parts (to complete the molding) are identically alike as to shape and relative position, while the lighter enamel facing extends from the incisal edge upwardly for approximately two-thirds of the tooth body without extending over the neck portion. In this manner, the cervical end of the tooth, including the neck portion, which corresponds to that in the finished tooth structure, is subjected to no severe strain, whereas in the actual use of the mold, pressure is exerted upon the biscuited tooth at the incisal end and adjacent portions. In this manner, the cervical and neck end of the biscuited tooth is firmly supported on all sides without being subjected to any objectionable crushing or bending strains during the final molding of the light enamel face portion.

My object is to so shape the two face forming mold parts, namely, one for forming the face of the body material for the short tooth and the other for molding the light shade porcelain material on the incisal end and approximately lower two-thirds of the short tooth body, to fill out the same to the full length tooth; and in so doing, to simply hold the upper third or neck portion of the body material of the short tooth against any further material change in shape or position, whereby the main strains during the molding of the light colored porcelain material are wholly confined to the incisal end and lower portion of the tooth body, and wherein there is sufficient space between the biscuited short tooth body and the molding surface for the final facial finish to permit of the light shade plastic enamel material to adjust itself to the surface of the short tooth backing and without any cracking strains to be impressed thereon. In this manner, it is possible to diplicate the teeth in large quantities without any appreciable difference between the tooth structure and without any material production of defective teeth, and withall, assuring that all teeth made with a given set of mold parts and shade of enamel material will be uniform in all respects.

With the above and other objects in view, the nature of which will be more fully understood from the description hereinafter, the invention consists in the novel construction of mold parts and the method employed in the multiple stage operations, all as hereinafter more fully described and defined in the claims.

In the drawings, Fig. 1 is a side view of a pair of mold parts for molding the full size teeth; Fig. 2 is a transverse section of the same, taken on line 2—2; Fig. 3 is a duplicate of the upper mold part in Fig. 2, with a portion cut away; Fig. 3$^a$ is a cross section of the mold part corresponding to the face mold part of Fig. 4, when cast from an assembly of the face mold part of Fig. 4; Fig. 4 is a transverse section on line 4—4 of Fig. 5, and showing the mold of Fig. 2 when modified and with the employment of the mold part Fig. 3; Fig. 5 is an inverted plan view of the modified mold parts shown in Fig. 4; Fig. 6 is a transverse section of a further modification of the structure of Fig. 2; Fig. 7 is a side view of one of the steel master tooth dies employed in the process of making the mold die parts; and Fig. 8 is a longitudinal sectional view through the molded tooth in biscuited form, as made from the use of the molds herein described.

The structure of mold illustrated in Figs. 1 and 2 may be considered as being of the ordinary construction of the two-part mold and which is made from patterns formed from carved tooth forms and finished for cooperation between its back part 2 and face part 3, each of which are provided with tooth recesses cooperating to provide molding chambers of the full size of the teeth to be formed (with allowance for shrinkage of the porcelain material). When these mold parts 2 and 3 have been machined and finished by hand carving, as may be required, the master tooth dies, such as shown in Fig. 7, are placed within the cooperating die recesses 4 and 7 of the mold parts 2 and 3, and thereafter said parts are subjected to pressure, with the result that the fine surface characteristics of the hardened steel dies are impressed into the surfaces of the mold parts 2 and 3, though, in practice, the importance of this operation is largely upon the recess portion 7 which corresponds to the labial face of the tooth. These fine markings of the tooth surface are also extended up upon the neck portion of the tooth, said neck portion being indicated at 5. So far, there is nothing out of the ordinary practice in making these mold parts 2 and 3 for commercial use in the manufacture of artificial teeth, and it will be understood that the final molding operation of the teeth produced in the manner hereinafter described may be performed by a pair of molds of this character.

I will now describe the character of the mold parts and the results obtained which are specially applicable to the preliminary or first stage of the molding operation and which is completed by the use of the said mold parts 2 and 3 of Figs. 1 and 2.

Referring more particularly to Figs. 3, 4 and 5, 2 is the lower or back mold part and is provided with a plurality of tooth recesses 4 to shape the lingual portion of the tooth, and this part of the mold is constructed similarly to the usual forms employed commercially. The mold part 3$^a$, shaped for cooperative use with the back mold part 2, is provided with tooth recesses which correspond partly to the face of the finished tooth and partly to the labial wall of the body part and upon which the lighter enamel facing is subsequently applied.

Referring to Fig. 4, the recessed portion 5 of the mold part 3$^a$ is shaped for molding the labial face of the neck portion of the finished tooth, whereas the part 7$^a$ is shaped to form the outer surface of the body material which fills the space between the mold parts so that the length of the tooth body is less than the total length of the finished tooth, and likewise of less thickness in the labial-lingual direction for the lower two-thirds of the tooth as shown in Fig. 8 at A. The mold recesses 7$^a$ are formed in the face of a metal bar 6$^a$ which is more or less rectangular in cross section and fits into a rectangular recess 9 in the body portion 3$^a$. This bar 6$^a$ may be retained in position upon the body part 3$^a$ by a wedge shown at 11 in Fig. 5, or by the screws 12 shown in Fig. 4, either or both. In practice, the backing and face mold parts provide for the molding of two rows of teeth as indicated in Figs. 1, 2 and 5, and, therefore, what is shown in Fig. 4 is, in actual practice, duplicated, except that it is arranged in the reverse order, as will readily be understood by reference to Fig. 2.

The two mold parts 2 and 3$^a$ have their ends formed with flat surfaces 15$^c$ and 15$^a$ respectively, which prevent undue pressure at the borders of the molding recesses; and dowel pins 15 on one mold part fitting apertures 16 on the other mold part, insure the proper assemblage of the mold portions with respect to each other. It will readily be understood that for all practical purposes, the bar 6$^a$ may, so far as the molding function is concerned, be considered as an integral part of the mold body 3$^a$, but for reasons to be later explained, the removable mold bars 6 are employed. It will be understood, however, that with the combination of the mold parts 2 and 3$^a$ and removable mold bar 6$^a$, the tooth structure which is molded in the space 8, and hence partly in the recesses 4, 5 and 7$^a$, is complete for the finished tooth except as to the part 7ª, and this part of the tooth is undersize both vertically and transversely in a lingual-labial direction.

Before leaving Fig. 4, it is pointed out that the removable post 13 for supporting the anchor 14 in proper position to be molded within the tooth body may be employed as shown, this employment being as heretofore and no further mention of the post and anchor need be made.

Referring now to Fig. 5, the back mold part 2 is identically the same as heretofore and is, in fact, the mold part 2 of Figs. 1 and 2. The face mold part 3ª is the same as the part 3 shown in Fig. 2, but modified as in Fig. 3ª and supplemented by the bar 6ª. The mold recesses 7ª of the part 6ª are somewhat differently shaped than the recesses 7 of Fig. 2.

The operation of molding the artificial teeth ready for vitrification, by the use of the mold parts disclosed in Figs. 1 to 5, inclusive, is as follows: Within the recess 4 of the back mold part 2, the darker shade body material is placed about the post and anchor, and similarly, some of the same material is placed in the recessed portions 5 and 7ª of the mold part 3ª and the two parts of the mold, 2 and 3ª, are then placed together and the dark shade materials compressed to fill out the mold space 8 and to form the body portion A of the tooth structure indicated in Figs. 4 and 8. This provides a tooth body of smaller size in respect to its incisal end and the lower two-thirds of its face portion, but the shape of the neck portion 5 is compressed to its full size, and has in its face all of the fine markings required by the finished tooth. The mold is then subjected to sufficient heating to dry out or slightly bake the body material contained within the molds to bring the porcelain material to a biscuited condition. When this has been accomplished, the mold part 3ª is removed, leaving the biscuited body portion A in the mold part 2. Thereafter, the mold part 3 of Figs. 1 and 2 is supplied with the lighter porcelain material at its incisal end and over its surface 7 and applied to the mold part 2 with the biscuited teeth therein, and in this manner the light shade porcelain material B (see Fig. 8) is molded as a facing upon the body material and providing the incisal end of the tooth structure. When this has been accomplished, the mold parts 2 and 3 are then subjected to sufficient heat to dry out the enamel facing material B to provide a biscuited tooth of the full size which is then removed from the mold parts and subjected to vitrification in the usual manner. Before vitrification, the post 13 is removed, leaving the usual anchor 14 and a hole leading to it, such as when soldered pin teeth are to be produced. In those cases where a pin is to be baked in with the tooth, such pin would be represented by the post 13 and would remain with the tooth during vitrification, but in such cases, the post must be made of platinum or other high melting alloy that will not fuse at the vitrification temperature.

By making an artificial tooth in this manner, the shaping of the body material A and the facing material B will be accurately accomplished and, moreover, the finest carving and characteristics of the face of the tooth will be retained from the incisal end to the highest point in the neck. It will also be understood that the mold part 3ª, so far as its neck portion 5 is concerned, is identically the same as the corresponding part of the mold part 3 for the finished tooth. The shape and configuration as to details of marking in the neck portion will be identically the same in the two stages of molding, namely, first with the mold part 3ª and then with the mold part 3, in conjunction with the same back part 2. It will further be understood that as the back part 2 is used with both the face mold parts 3 and 3ª and that the body material A in both instances remains in identically the same position in the back mold part, no undue strains can be exerted to crack or weaken the biscuited body part A during the molding operation of the facing part B. Furthermore, the facing part B is kept well below the top and the neck so that no strains are put upon the neck portion corresponding to the part 5. Moreover, the molding of the light shade material B puts little or no pressure upon the middle part of the face of the biscuited tooth part A, whereas at the incisal end, where a larger body of the material is being molded, the molding operation comes between two metal dies and consequently there is little or no tendency to produce defective action upon the biscuited part A. By reason of these facts, the more or less brittle biscuited body portion A is not injured in any manner by the final application of the light shade facing material B.

If desired, the mold part 3 of Fig. 2 may be entirely omitted and the mold part 3ª formed with two sets of removable bars, namely, the set corresponding to 6ª of Fig. 4 and 6 of Fig. 6. The only difference between what is shown in Fig. 4 and Fig. 6 is in the shape of the recessed surface 7ª of Fig. 4, as compared with the surface 7 of Fig. 6, the former being to provide the frontal surface of the body part A of the darker material, whereas the latter is intended to provide the labial face of the light shade porcelain facing material B, for two-thirds of the lower part of the tooth structure, and all of the incisal end. If, therefore, it was intended to carry on the two-stage molding with the back mold part 2 and the face mold part 3ª, it would then be required to assemble the mold bars 6ª with the mold part 3ª, as in Fig. 4 and use it in that combination to produce the dark colored body material A of the tooth. After baking, the mold part 3ª is removed, the mold bars 6ª taken out and substituted by the mold bars 6 to constitute the construction illustrated in Fig. 6. When this is done, the light shade porcelain material is placed within the recess 7 of the bar 6 and thereafter the said material is compressed upon the lower end and adjacent frontal surface and then biscuited by heat to provide a tooth form of the full size as in Fig. 8. This is removed from the molds and vitrified in the usual manner. In this procedure, it is seen that as the neck portion 5 is molded by the same mold parts and with the same back die portion 2, no undue strain can come upon the biscuited tooth and, therefore, no ruptures or weaknesses are produced.

In making up the mold part 3ª with interchangeable bars 6 and 6ª, it will be necessary that the facial surface 5 must have impressed upon it the finer lines or characteristic surface forms of the finished tooth and this is also similarly required in the case of the labial portion 7. To accomplish this, the steel master die (Fig. 7) would be inserted between the mold parts 2, 3ª and 6 and subjected to pressure to insure the proper configuration marks of the facial portions 5 and 7 for the finished tooth. Having once so impressed the neck portion 5, it would not be necessary to use the dies (Fig. 7) when substituting the mold part 6ª, because the surface 7ª of such bar is not required to mold the labial surface of the tooth.

By reason of the following out of the method of this molding, no undue strain is put upon the biscuited tooth structure where the light colored porcelain material would need to be relatively thin, and consequently the main strain is centered toward the incisal end X (Fig. 8) where there is a greater body of the light shade porcelain material and where the same is molded between metal surfaces instead of between a metal surface and the biscuited tooth structure. Experience has shown that with molds of this character, the two-part molding operation is capable of being repeated indefinitely without any material loss by defective results.

The molds as described may be used indefinitely by substituting the two mold bars 6 and 6ª alternately in position upon the body part 3, but in commercial practice, in manufacturing teeth on a large scale, it is more desirable that this shifting of the mold bars shall be avoided. With this end in view, the mold structure indicated in the upper part of Fig. 4 may be formed in a single casting by using the mold part 3ª with the mold bar 6ª and wedge 11, all definitely held in place so as to be handled as a unit, and employed as a pattern, and by reason of which the face mold part shown in Fig. 3ª may be produced. When this is done, the bar 6ª may be removed from the mold body 3ª and the mold bar 6 substituted, as in Fig. 6. If now only one mold set is required, the bar 6 may be permanently held in position by the screw 12 and we will then have three mold parts operating in pairs, that is to say, back mold part 2 will then cooperate with new integral mold part Fig. 3ª to perform the functions shown in Fig. 4, and thereafter, the back mold part 2 will cooperate with the mold parts 3ª and 6, as in Fig. 6, and substitution of the mold bars will then be avoided. On the other hand, if there are to be a large number of molding sets, then as many duplicates, corresponding to Fig. 3ª, may be made as desired, and similarly, an additional number of integral face mold parts may be made by using the parts 3ª, 6, and 11 of Fig. 6 as the pattern.

The essential requirement in these improvements resides in the avoidance of any material distortion or change of form in the neck portion of the tooth body after it has been formed by the first molding operation with the face mold part 3ª having the recess portion 7ª or their equivalent. When the neck has been perfectly molded by recess 5 during the first stage of the molding operation and the making of the short tooth (Fig. 4), the subsequent or final molding for applying the light shade porcelain material B to the short tooth body A (whether done by face mold part 3 (Fig. 2) or by the mold part shown in Fig. 6), causes pressure to be impressed upon the material B at the incisal end, but the recess 5 does no pressure work beyond fitting down to clamp the fully molded neck portion and prevent its displacement in case of excessive pressure upon the material B. In this manner, the action on the neck in the second molding is resistant rather than active in molding. It will be apparent that the configuration of the recess 5 for the neck portion in the mold, Fig. 6, should be identical with the similar portion 5 in the mold shown in Fig. 4.

It has been explained that the master steel tooth dies, Fig. 7, are to be pressed into the recess portions 5 and 7, Figs. 2 and 6, and thereby enable the mold bodies 3ª to be produced with the proper shaping of the part 5. I have described this to take place in the face mold part 3 before modifying it to what is shown in Fig. 3ª and mold part 3ª, Figs. 4 and 6. In the case of Fig. 6, the master tooth die Fig. 7 must be impressed upon the recess 7 of bar 6 after it is in position in mold part 3ª. Therefore, in this case, it will suffice for the impression upon the neck recess 5 to take place only at this time. In the case of the parts in Fig. 4, this cannot be done since the recessed surface 7ª of bar 6ª extends too far into the tooth space to permit the use of the die in this manner. Because of this, the impressing by the master die must be made in a face mold part 3 (Fig. 2) before the same is grooved as at 9 to form the modified structure 3ᵃ in Fig. 3. An alternative to this may be done by completing the assembly of the bar 6ᵃ with the mold part 3ᵃ (before being impressed) and then employing master dies, Fig. 7, with the incisal end and lower labial surface ground away to a shape corresponding to the short tooth body A, to impress the neck recess 5 while the bar 6ᵃ is present. Furthermore, if the bar 6ᵃ is removed, then the full master die, Fig. 7, may be placed between the mold parts 2 and 3ᵃ, to impress the recessed portion 5; but this is not desirable, because the die would not be firmly held down in proper position and might put too great a pressure upon the corner juncture of the surface 5 with the grooved part 9. In making, therefore, the structure of Fig. 4, I prefer to either impress the tooth recess in part 3 with the master die before grooving the same as 9, or to employ the modified master die with the assembly of Fig. 4.

I have described my improved method and the mold means which I deem best suited to the requirements of the invention in commercial practice, but I do not restrict or confine myself to the minor or secondary details, either as to the method of procedure or the means employed in putting it into effect, as variations therein may be resorted to as matters of mechanical skill and without a departure from the spirit of the invention.

Having now described my invention, what I claim and desire to secure by Letters Patent is:

1. The herein described method for making artificial teeth, which consists in first molding a body portion of the tooth from relatively dark shade porcelain material between metallic mold surfaces to insure compression of the cervical and neck end to definite final shape and the incisal end and adjacent frontal portion of less than the final shape and size required, thereafter molding between the incisal end of the tooth body so formed and a hard mold part a quantity of relatively light shade porcelain material to fill out the incisal end and adjacent frontal portion only of the tooth body to the final shape and size required, and during this second molding operation confining the cervical and neck end of the tooth structure first molded between metallic mold surfaces identical in shape and molded size to the mold surfaces by which said neck end was molded and which hold said neck end from being affected by additional pressure, or change of shape.

2. The method according to claim 1, wherein further, the dark shade porcelain material first molded is applied in the plastic state and then dried before the light shade porcelain material is molded upon it.

3. The herein described method of molding a tooth body by two molding operations, the same consisting in molding the cervical and neck portions of the tooth body at once to their final shape and at the same time molding the incisal end and adjacent face portions of relatively dark shade porcelain material to a smaller shape than the final shape, and thereafter holding the said cervical and neck end of the molded tooth body against movement and without change of shape or surface configuration, and at the same time molding a light shade porcelain material to fill out the incisal end and face portions adjacent thereto to the final size required in the finished tooth shape.

4. The herein described method of molding a composite tooth body of dark and light shade porcelain material, the same consisting in molding between back and face mold parts a tooth body of dark shade porcelain material, the neck portion molded to full size as of the finished tooth to be made and the incisal end and adjacent face molded to less size than the full size of the finished tooth and thereby producing a short length tooth body having its neck portion molded to full size and final shape, thereafter subjecting the short length tooth body to the action of an additional face mold for molding upon the short length tooth body light shade porcelain material to form the incisal end and the adjacent face portions to bring said portions up to full size for the finished tooth, and during the molding of the light shade material upon the short length tooth body holding the neck portion first molded from movement and without change of shape.

5. The method stated in claim 3, wherein further, the short length tooth body is dried out to bring it to a biscuited form before the light shade porcelain material is applied to it.

6. The method stated in claim 3, wherein further, the short length tooth body is dried out to bring it to a biscuited condition before applying the light shade porcelain material to it, and throughout the molding operations holding the neck portion of the body by the same mold parts which formed it while the remaining molding of the incisal end and face portion adjacent thereto is performed by separate face mold parts, one for the dark shade material and another for the light shade material.

7. Molding devices for producing a tooth body as a preliminary step in the manufacture of artificial teeth, comprising a back mold part having a recess for molding the lingual surface of the tooth and a face mold part having a recess cooperating with the recess of the back mold part to mold a tooth body having a neck portion of the full size and with all the characteristic markings required in the finished tooth and the incisal end of less length and of less lingual-labial thickness than required in the finished tooth.

8. Molding devices for producing a tooth body as a preliminary step in the manufacture of artificial teeth, comprising a back mold part having a recess for molding the lingual surface of the tooth and a face mold part having a recess cooperating with the recess of the back mold part to mold a tooth body having a neck portion of the full size and with all the characteristic markings required in the finished tooth and the incisal end of less length and of less lingual-labial thickness than required in the finished tooth, and, wherein further, the recess in the face mold part is of less depth than required for molding a full sized finished tooth body and said depth increases gradually for approximately two-thirds of the vertical length of the tooth in an occlusal-gingaval direction and of the full depth in a labial-lingual direction required in the finished tooth throughout the neck molding portion.

9. Molding devices for producing a tooth body as a preliminary step in the manufacture of artificial teeth, comprising a back mold part having a recess for molding the lingual surface of the tooth body, and a face mold part having a recess cooperating with the recess of the back mold part to mold a tooth body of less size than required in the finished tooth, said face mold part consisting of a body having a recess shaped to mold the full size neck portion with all of the characteristic markings required in the finished tooth and a removable bar detachably secured upon the face mold part and formed with a recess for molding the incisal end and approximately two-thirds of the face of the tooth body adjacent to the incisal end, said recess in the bar being of less depth than required to mold the incisal end and the labial surface of the finished tooth.

In testimony of which invention, I hereunto set my hand.

THOMAS E. DIMELOW.